J. E. HOFFMAN.
COASTER VEHICLE.
APPLICATION FILED SEPT. 14, 1920.
1,371,421.
Patented Mar. 15, 1921
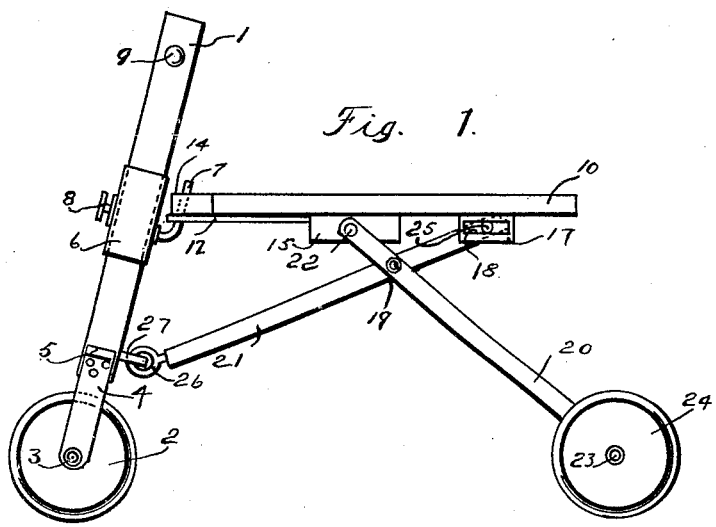
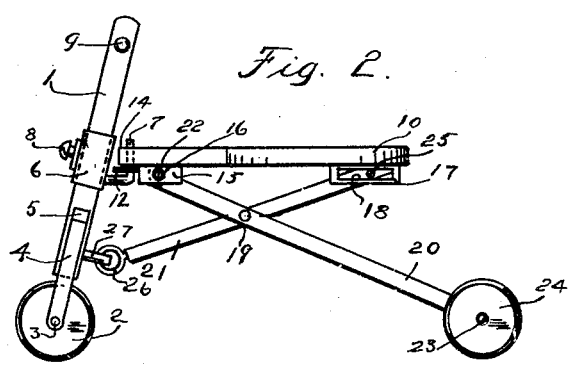
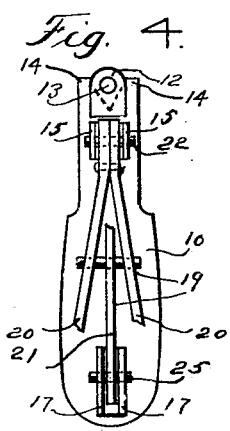
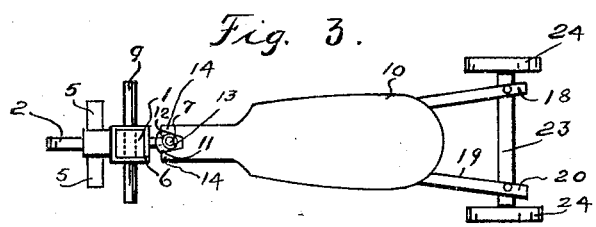
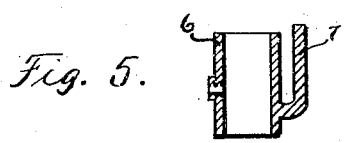
INVENTOR.
BY John E. Hoffman
M. C. Gillham
ATTORNEY.

UNITED STATES PATENT OFFICE.

JOHN E. HOFFMAN, OF KANSAS CITY, MISSOURI, ASSIGNOR TO UNIVERSAL NOVELTY MANUFACTURING COMPANY, OF KANSAS CITY, MISSOURI, A CORPORATION.

COASTER-VEHICLE.

1,371,421.     Specification of Letters Patent.     Patented Mar. 15, 1921.

Application filed September 14, 1920. Serial No. 410,090.

*To all whom it may concern:*

Be it known that I, JOHN E. HOFFMAN, a citizen of the United States, residing at Kansas City, in the county of Jackson and State of Missouri, have invented a new and useful Coaster-Vehicle, of which the following is a specification.

My invention relates to coaster vehicles, and the object of the invention is to provide a cheap knock-down vehicle of this character which may be conveniently transported and very easily assembled.

Another object is to provide a seat for the vehicle which may be adjusted vertically for children of different ages and having facility for limiting the steering of the pilot wheel to prevent overturning of the vehicle by momentum when the control of the steering post is lost and for keeping the seat constantly in horizontal position or plane.

I attain these objects and other advantages by means of the mechanism and combination of parts illustrated in the accompanying drawing in which—Figure 1, is a side elevation of a coaster vehicle embodying my invention; Fig. 2, is a side elevation of the same, and showing a modified form of attaching the seat on the seat supports; Fig. 3, is a top plan view of the same; Fig. 4, is a view of the lower side of the seat, and showing the seat supports pivoted together and pivoting on the seat, also showing the limiting stops at the forward end of the same and, Fig. 5, is a sectional view of the seat adjusting member.

Similar numerals of reference refer to corresponding parts throughout the several views.

The numeral 1, designates a vertically disposed steering post which is mounted on a pilot wheel 2, secured on a shaft 3, which is mounted in the lower portions of oppositely disposed metal straps 4, secured on the lower end portion of the steering post, the upper end portions of the straps are bent outwardly at right angles to form foot rests 5. A metallic seat adjusting member 6, is slidably mounted on the steering post and is provided, rearwardly, with a vertically extending post 7, and, forwardly, with a set screw 8, adapted for impinging upon the steering post to hold the member 6, in place. A handle bar 9, is provided adjacent the upper end of the steering post. A seat 10, having a V-shaped recess 11, in its forward end and a bearing plate 12, attached on its lower side and provided with a hole 13, which is adapted for loosely receiving the post 7, and disposed so as to open substantially at the center of the recess 11, and thus, when the seat is assembled with the member 6, on the steering post, the latter will be limited in its motion by the ends of the seat at the sides of the recess which form motion limiting stops 14. The lower side of the seat is provided, forwardly, with down flanges 15, having oppositely disposed pivot holes 16, and rearwardly, with down flanges 17, having oppositely disposed elongated pivot bearings 18. A seat supporting frame 19, comprising an inverted V-shaped member 20, and a member 21, which is pivoted between the side portions of the member 20. The upper joined ends of the member 20, are pivoted between the flanges 15, by pivot 22, operating in pivot holes 16, and the lower diverging ends of the member 20, are attached on an axle 23, having bearing wheels 24. The upper end of the member 21, is provided with a transversely extending pivot 25, which is entered into the elongated bearing 18, where it operates to turn and slide therein responsive to the movement of the members 20 and 21, on their pivot, and the lower end of the member 21, is provided with an eye bolt 26, which is linked with an eye 27, on the lower end of the steering post.

To assemble the vehicle, the seat 10, is hung on the post 7, on the seat adjusting member 6, by entering the post in the hole 13, in the plate 12, and thereby bringing the adjusting member in close proximity to the end of the seat, so that the member shall contact the ends of the seat, at the sides of the recess 11, when the steering post shall be turned to the right or left, thus limiting the steering of the vehicle to prevent overturning thereof should the child thereon lose control of the steering post. The upper ends of the supporting members 20 and 21 are respectively pivoted on the flanges 15, and 17, and are pivoted together, the lower ends of the members are respectively attached on the axle having the bearing wheels and the member 21, linked on the steering post. The seat supporting members 20 and 21, are thus arranged to fold, so that when the seat adjusting member 6, is raised on the steering post, the frame will be folded and, when the adjusting member is lowered, the frame will open. Thus the vehicle is adapted for small and large children. When the frame closes, as when the seat is raised, the pivot 25, moves inwardly, in the bearing 18, and when the seat is lowered, the pivot travels rearwardly in its bearing. This provision is for the purpose of constantly keeping the seat in a horizontal plane for the safety and comfort of the child.

It is obvious that a child's coaster vehicle embodying my invention and limiting the steering range of the steering post and maintaining the seat in a horizontal plane provides factors of safety which prevent overturning headlong of the vehicle should control of the steering post be lost during the gravity run of the car, and the strain incident to a tilted seat is entirely avoided.

Having described my invention what I claim is—

In a coaster vehicle, the combination of a vertically extending steering post having a bearing wheel at its lower end, a sleeve slidably and detainingly mounted on said steering post, a seat pivotally connected with said sleeve, the forward end portion of said seat being arranged for limiting the turning of said steering post, an inverted V-shaped member pivoting on the forward portion of said seat and the diverging sides thereof provided with bearing wheels, and a plane member pivoting on said first mentioned member and having its upper end pivotally and slidably arranged on said seat and its lower end linked with said steering post.

Dated, Kansas City, Missouri, September 10, 1920.

JOHN E. HOFFMAN.

Witnesses:
HERMAN EXSTEIN,
EVERETT L. McKAY.